United States Patent [19]
Heiberger

[11] 4,325,015
[45] Apr. 13, 1982

[54] DUAL MOTOR DRIVE FOR MACHINE TOOL

[75] Inventor: Francis E. Heiberger, Elmhurst, Ill.

[73] Assignee: Danly Machine Corporation, Chicago, Ill.

[21] Appl. No.: 151,899

[22] Filed: May 21, 1980

[51] Int. Cl.³ ............................................. G05B 11/32
[52] U.S. Cl. ..................................... 318/625; 318/10; 318/630; 318/65; 82/2 B
[58] Field of Search .................... 318/5, 10, 625, 567, 318/590, 630, 40, 48, 54, 65; 82/2 B

[56] References Cited

U.S. PATENT DOCUMENTS

| | | | |
|---|---|---|---|
| 3,351,830 | 11/1967 | Samson et al. | 318/48 |
| 3,434,025 | 3/1969 | Parkinson et al. | 318/48 |
| 4,087,731 | 5/1978 | Rhoades | 318/625 |

Primary Examiner—B. Dobeck
Attorney, Agent, or Firm—Leydig, Voit, Osann, Mayer & Holt, Ltd.

[57] ABSTRACT

A dual motor drive for the turntable of a numerically controlled machine tool in which separate forward and reverse drive motors geared to the turntable are used for eliminating the effect of backlash. Circuitry, including amplifiers, is interposed between a source of numerical control signal and the motors for energizing the motors alternatively in the numerically controlled mode depending upon the polarity of the control signal and at a speed which depends upon the magnitude of such signal. For operation in the lathe mode, sources of auxiliary control signal of first and second polarity are provided. Also provided are a polarity inverter and first and second sets of auxiliary switches for selectively reversing the direction of the respective drive motors so that when an auxiliary signal of first polarity is applied both motors serve additively to drive the turntable in the forward direction and so that when an auxiliary signal of second polarity is applied both motors serve additively to drive the turntable in the reverse direction. A manual selector determines the polarity of the auxiliary signal, the inversion thereof, and the direction of rotation, the numerical control signal being disabled during operation in the lathe mode.

6 Claims, 5 Drawing Figures

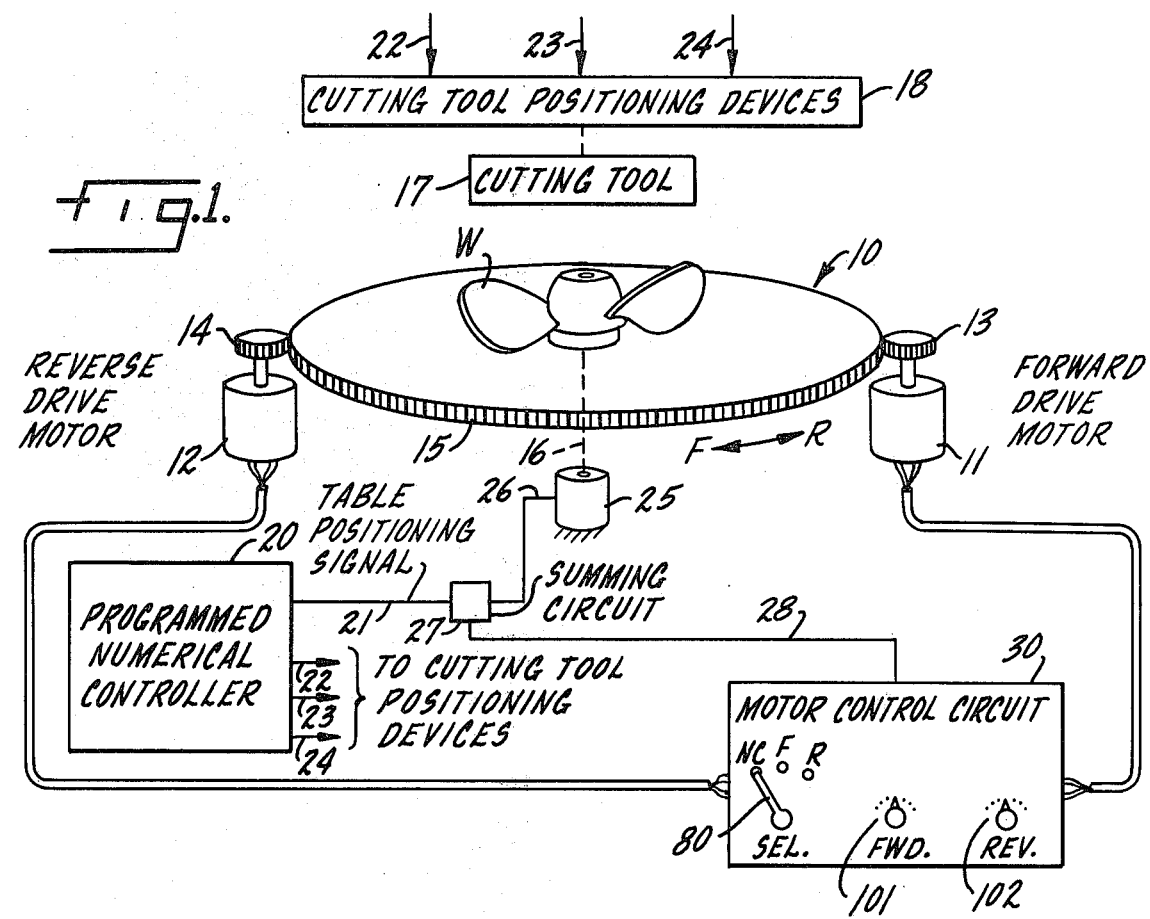
Fig. 1.
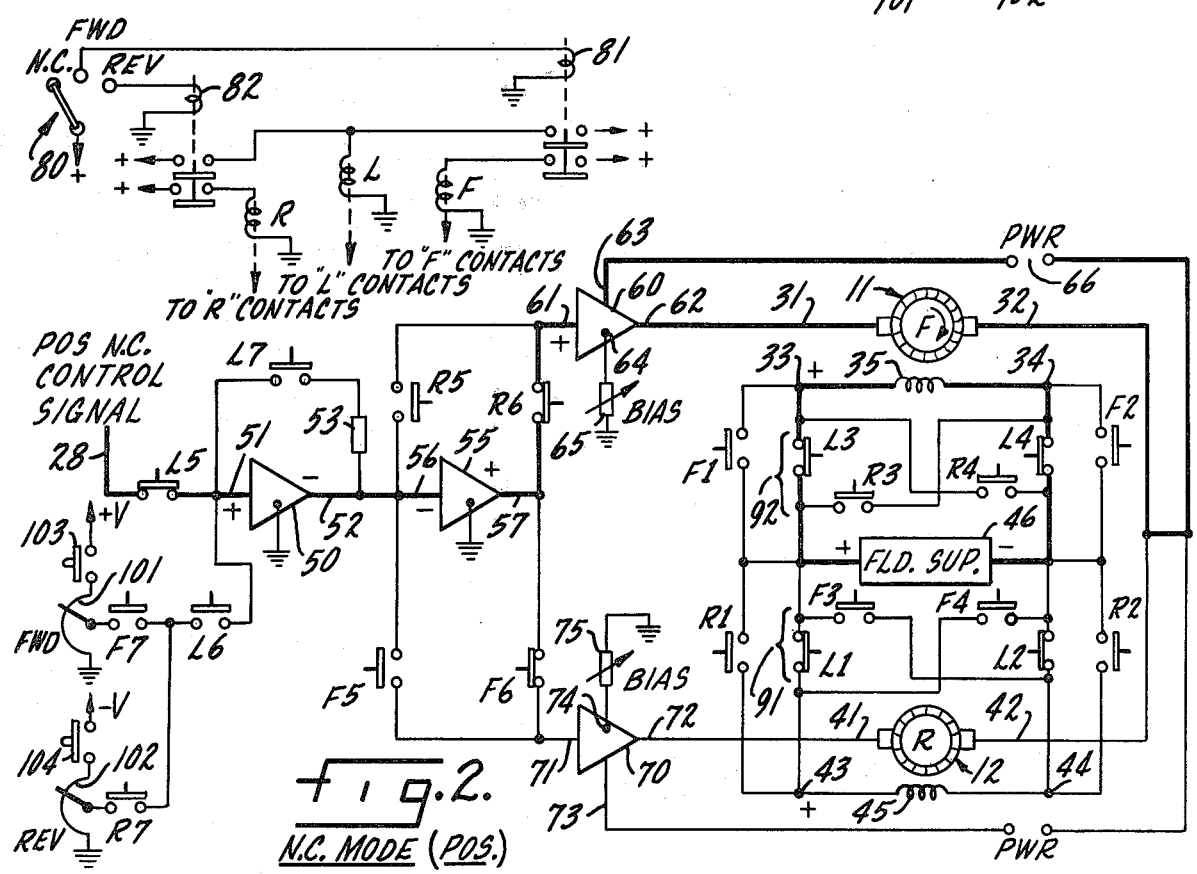
Fig. 2. N.C. MODE (POS.)

N.C. MODE (−INPUT)

FWD. LATHE MODE

REV. LATHE MODE

DUAL MOTOR DRIVE FOR MACHINE TOOL

It is known to drive the turntable of a numerically controlled machine tool by means of separate forward and reverse drive motors for the purpose of removing the effect of backlash in the gearing as the turntable is driven repeatedly in forward and reverse directions. It is characteristic of such a system that each motor acts alone to drive the turntable in one direction so that the remaining, relatively de-energized, motor does not contribute to the driving torque.

It is the object of the present invention to provide an arrangement whereby both the forward and reverse driving motors are utilized additively and in unison, when the turntable is operated in the lathe mode, to drive the turntable in the forward and reverse directions.

Therefore it is an object to provide a dual motor drive for the turntable of a machine tool in which twice the torque is available when operating in the lathe mode, making the turntable capable of taking a heavier cut than would otherwise be possible. Conversely it is an object to provide a turntable in which a given torque loading may be accommodated by motors of smaller size than normally used.

It is a general object of the invention to produce a dual motor drive system for a machine tool turntable which is highly efficient, making full use of the total torque capability built into the system but which is, at the same time, inherently economical and universally adaptable to new dual motor installations as well as installations already in the field.

Other objects and advantages of the invention will become apparent upon reading the attached detailed description and upon reference to the drawings in which:

FIG. 1 is a diagram, in perspective, showing the turntable of a machine tool with its forward and reverse drive motors and with an associated numerical controller and motor control circuit indicated in block form.

FIG. 2 is a schematic diagram of the motor control circuit of FIG. 1 operating in the N.C. mode with an input signal of positive polarity.

Figure 3:
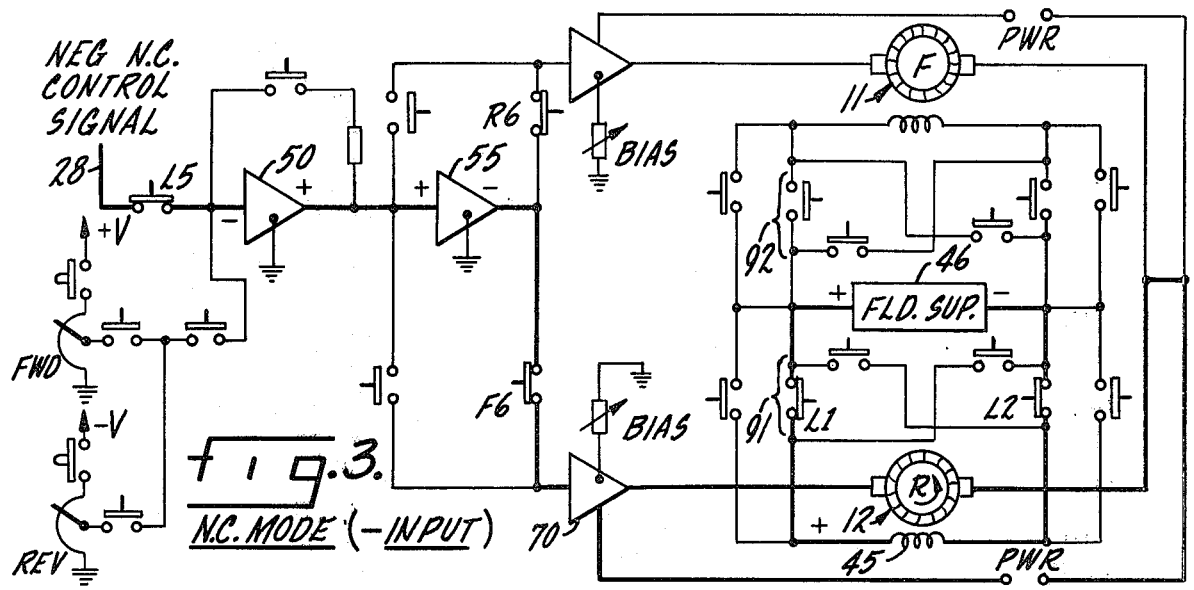
FIG. 3 shows operation of the circuit in the N.C. mode but with a negative input signal.

While the invention has been described in connection with a preferred embodiment, it will be understood that I do not intend to be limited to the particular embodiment shown but intend to cover various alternative and equivalent constructions included within the spirit and scope of the appended claims.

Turning now to FIG. 1 there is shown a machine set-up, in diagrammatic form, including a turntable 10 operating in the numerically controlled mode with the turntable being driven alternatively by forward and reverse drive motors 11, 12. The motors have pinions 13, 14 which engage a circular rack 15 extending about the periphery of the table. Securely clamped to the table for rotation about a central axis 16 is a work piece W acted upon by a cutting tool 17 movable along a plurality of axes, for example three axes, by positioning devices indicated generally at 18.

For energizing the motors and tool positioning devices in the numerically controlled mode, which will be considered the "normal" operation of the system, a programmed numerical controller 20 is provided having, in the present embodiment, terminals 21–24, terminal 21 producing a table positioning signal while terminals 22–24 serve to position the cutting tool along respective axes. Coupled to the table is a rotary position transducer or "resolver" 25 which may, for example, be of the synchro type having a terminal 26 providing a feedback signal. The positioning signal and feedback signal are fed into a summing circuit 27 having an output terminal 28. The signal at the terminal 28 serves to command a motor control circuit 30.

The operation of a turntable in a numerically controlled machine tool set-up is well known. It will suffice to say that the numerical controller produces a set of coordinated positioning signals which affect both the table and the tool. The table command signal received at 28, and which varies in both polarity and magnitude, commands the motor control circuit 30 to energize one of the motors or the other at a speed which depends upon the magnitude of the signal. Preferably the motor control circuit is biased, by means to be described, so that the relatively de-energized one of the motors applies a small amount of torque in opposition to the driving torque thereby to preclude any effect of play or backlash at the engaged teeth.

In accordance with the present invention the motor control circuit 30 includes a source of auxiliary control signal of first polarity and a first set of auxiliary switches for reversing the direction of the reverse drive motor so that, when a signal of first polarity is applied, both motors serve to drive the turntable in the forward direction in the lathe mode. A source of auxiliary control signal of second polarity is also provided with a second set of auxiliary switches for reversing the direction of the forward drive motor so that when a signal of second polarity is applied both motors serve to drive the turntable in the reverse direction.

The circuit of the motor control circuit 30 will next be described in connection with FIG. 2 in the N.C. mode and with a positive input signal, with the energized lines being of bold width. It will be noted first of all that the motor 11 has armature terminals 31, 32 as well as field terminals 33, 34, the latter supplying a field 35. Similarly the motor 12 has armature terminals 41, 42 and field terminals 43, 44, the latter supplying a field 45. In the description which follows attention will first be given to the manner in which the control signal, at terminal 28, affects the motor armatures during normal N.C. control. In the latter condition, both of the field windings 35, 45 are connected, with normal polarity, to a direct voltage field supply indicated at 46. With the fields thus energized the direction of rotation of the turntable depends only upon which of the armatures is energized.

The N.C. command signal, from terminal 28, first passes into a preamplifier 50 having an input terminal 51 and an output terminal 52. This preamplifier both amplifies and inverts the signal. Because of the low level of the usual N.C. signal, the preamplifier has a relatively high gain, but a negative feedback connection 53, which may be a resistor in shunting relation, is capable of reducing the gain during operation of the turntable in the lathe mode. In the N.C. mode, however, the negative feedback connection is open circuited, as shown.

The amplified signal is next passed to a second preamplifier 55 having an input terminal 56 and an output terminal 57 and which constitutes a second stage of amplification and inversion. The output terminal feeds power amplifiers which control feeding of current to the armatures of the respective motors. The "forward" power amplifier indicated at 60 has an input terminal 61, an output terminal 62, a common, or return, terminal 63 and a bias adjusting terminal 64, the latter being connected to a bias control 65. The terminals 62, 63, which define the load circuit, are connected in series with the armature of the motor 11 and with a pair of d-c power terminals 66.

The power amplifier 70 associated with the reverse driving motor 12 has input and output terminals 71, 72, a common terminal 73 and a bias terminal 74 which is connected to a bias controlling element 75. The two amplifiers 60, 70 are similar to one another but differ in the respect that the amplifier 60 is constructed to respond only to positive input voltages while the amplifier 70 responds only to negative input voltages; consequently, the two amplifiers act to turn on the driving motors alternatively depending upon the polarity of the applied signal. The bias circuits of the amplifiers are so adjusted, by elements 65, 75 so that a limited amount of current is applied to the armature of the relatively de-energized one of the motors even though the signal applied to the associated power amplifier is of zero or "wrong" polarity so that the de-energized motor acts oppositely to the torque of the driving motor for constant take-up of lost motion or backlash between the inactive pinion and the rack teeth.

It will be seen, then, that a positive command signal at input terminal 28 serves to energize the forward drive motor 11 as follows: The signal is inverted in the first preamplifier 50 and re-inverted in the second preamplifier so that a positive voltage appears at the input terminals 61, 71 of the two power amplifiers. The positive input signal at amplifier 60 turns the amplifier on so that the table is driven by the motor 11 in the forward direction. However, the positive input signal at input terminal 71 of amplifier 70, being of "wrong" polarity, is ignored by the amplifier so that the motor 12 remains turned off except for the taking up of the backlash previously described.

In the case of a negative command signal during N.C. type control, the effect is illustrated in FIG. 3. The N.C. command signal, after double inversion, applies a negative input signal to the two power amplifiers. The negative signal is ignored by amplifier 60 but accepted by the amplifier 70 which controls the reverse motor 12, turning on the reverse motor for driving of the turntable in the reverse direction.

In carrying out the invention a first set of switches, controlled by relays, are provided for reversing the direction of the reverse drive motor so that when an auxiliary control signal of first polarity is applied to the associated power amplifier in inverted form both motors serve additively to drive the turntable in the forward direction in the lathe mode. A second set of auxiliary switches are provided for reversing the direction of the forward drive motor so that when the signal of second polarity is applied in inverted form to the associated power amplifier both motors serve to drive the turntable in the reverse direction.

Returning attention to FIG. 2 a selector switch 80 is provided having "N.C.", "forward" and "reverse" positions. The "forward" contact operates a relay 81 while the "reverse" contact operates a relay 82. Such relays turn on forward and reverse relays F and R, respectively. In addition, actuation of either relay 81 or 82 turns on a relay L. These relays have associated normally open and normally closed contacts as designated by the relay designation F, L and R plus a number subscript, the contacts being illustrated, in FIG. 2, in their "normal" or relay-deenergized condition.

For the purpose of applying field current to motor 11 for normal driving in the forward direction, contacts F1, F2 are provided on relay F. Similarly for supplying current to the field winding of motor 12 for normal rotation in the reverse direction, contacts R1, R2 are provided on relay R. However, for reversing this "normal" condition a first set of auxiliary contacts 91 are associated with the field winding of the reverse drive motor while a second set of auxiliary contacts 92 are associated with the field circuit of the forward drive motor. The first set of contacts includes a pair of isolating contacts L1, L2 associated with relay L and a pair of reversing contacts F3, F4 associated with relay F. The second set of auxiliary contacts 92 includes isolating contacts L3, L4 and reversing contacts R3, R4.

In addition to the sets of field reversing contacts, contacts are associated with the inverting preamplifiers 50, 55 to secure a net inversion thereby to enable both power amplifiers 60, 70 to be turned on by the same polarity of auxiliary control signal. Thus to enable the reverse power amplifier 70 to be turned on by a control signal which is positive at the input of the preamplifier 50, switch F5 is provided for establishing a direct connection between the first preamplifier and the power amplifier 70. Because of the inversion which occurs in the preamplifier 50 a positive input signal, at 51, results in a negative signal at the input terminal 71 of the power amplifier 70, causing the power amplifier to be turned on. At the same time the normal energizing connection at the output of the second preamplifier is broken by means of normally closed contact F6. The net result is that both motors are energized simultaneously. Since the direction of the field current has been reversed by the set of contacts 91 the second motor is reversed in direction so that the two motors act additively in driving of the turntable in the forward direction.

The contacts R5, R6 controlled by the relay R perform an analogous function for the power amplifier 60, causing such power amplifier to turn on even when the input signal to the circuit, at terminal 51 of the first preamplifier, is negative, by reason of the inversion of the signal which occurs in the first preamplifier.

For the purpose of supplying auxiliary positive and negative auxiliary control signals for rotation of the turntable in the forward and reverse directions, respectively, in the lathe mode, potentiometers 101, 102 are provided, supplied from respective positive and negative voltage sources through manual switches 103, 104. The potentiometer wipers are respectively connected to the input terminal of the first preamplifier via contacts F7, R7 controlled by the relays F and R. Finally, for disabling the normal control signal at the command terminal 28 while one of the auxiliary control signals is being applied, normally closed contact L5 is in series with the terminal 28 while normally open contact L6 is used to complete a circuit to one of the potentiometers.

Finally, means are provided for reducing amplifier gain while one of the auxiliary control signals is being applied. This is accomplished by normally open contact L7 which is in a negative feedback circuit which shunts the first preamplifier and which includes shunting element 53 previously referred to.

Figure 4:
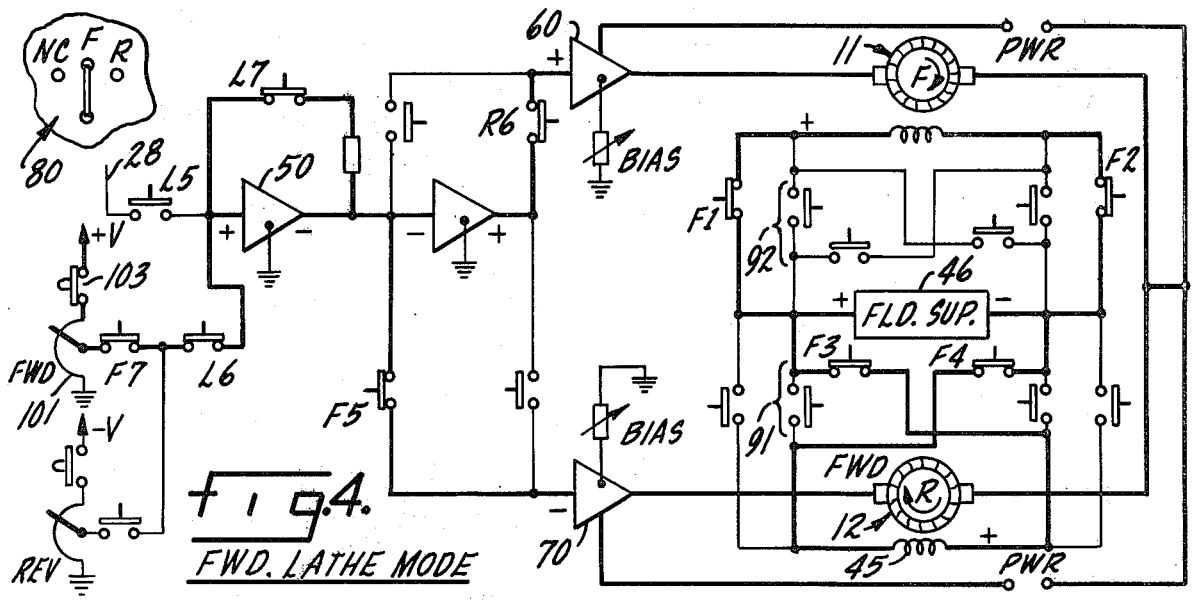
FIGS. 4 and 5 show the motor control circuit operating in the lathe mode with respective positive and negative input signals for forward and reverse driving.
Figure 5:
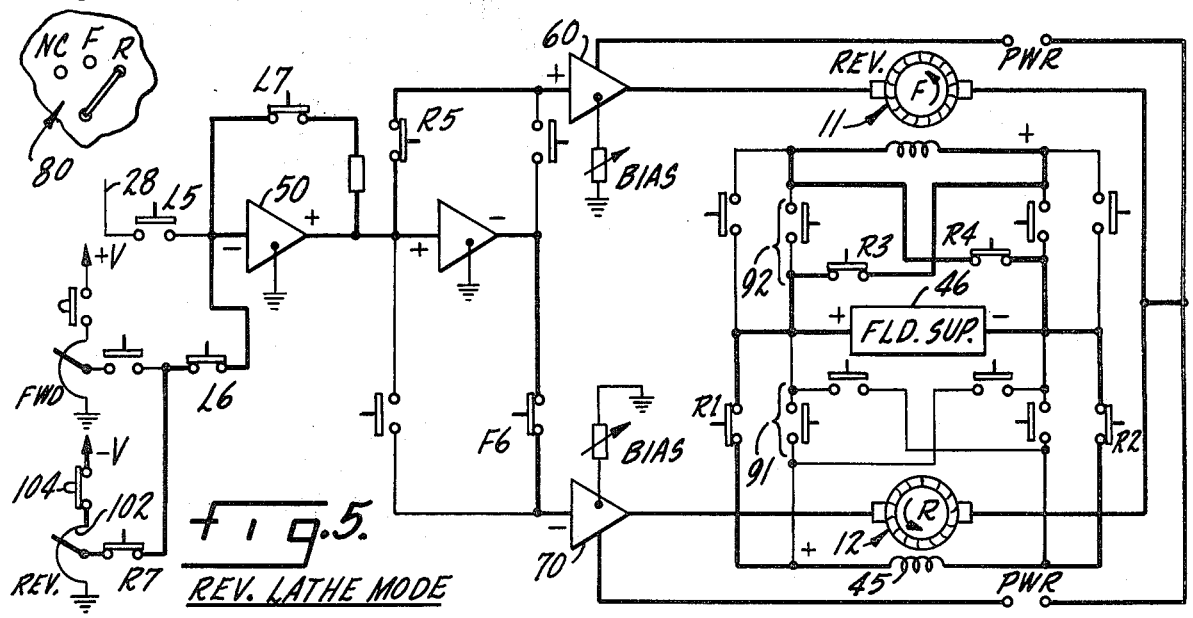

The operation of the circuit in the forward and reverse lathe modes will be apparent upon reference to FIGS. 4 and 5, respectively, in which the activated portion of the circuit is highlighted by the bold lines and in which the switches are shown in their "thrown" conditions.

Thus taking up first operation in the forward lathe mode, with the selector switch 80 in its "forward" position, relay 81 is energized which, in turn, energizes relays L and F. Switch L5 disconnects the normal input terminal 28 while switches L6 and F7 complete a circuit from the "forward" potentiometer 101. Closing the manual switch 103 thus results in the application of positive auxiliary voltage to the first preamplifier 50. This results in the turning on of both of the power amplifiers: The power amplifier 60 is turned on by positive voltage flowing through switch R6, while power amplifier 70 is turned on by negative voltage flowing through switch F5. Thus the armatures of both of the motors are energized.

In addition the set of switches 91 are thrown to reverse the current flowing through the field winding 45 of the reverse drive motor 12 so that the reverse drive motor drives in the forward direction with its torque being additive to the torque produced by the forward drive motor 11.

Thus assuming that both of the motors have the same rating the torque, and hence power, available in the lathe mode are doubled, thereby doubling the work capacity of the table.

The additive relationship of the two drive motors may be just as simply achieved in the reverse direction as illustrated in FIG. 5, where the selector switch 80 is shown in its "reverse" setting. This energizes relay 82, which turns on both relays R and L. Pressing manual switch 104 applies an auxiliary negative control voltage from potentiometer 102 through switches R7, L6 to the input terminal of the first preamplifier 50, the normal input terminal 28 being, as in the previous case, isolated by the opening of switch L5. The gain of amplifier 50 is here, again, reduced by closure of switch L7 in the negative feedback circuit.

Closure of switch F6 applies a negative control voltage to the power amplifier 70, turning on the latter for energization of the armature of motor 12. At the same time, closure of switch R5 causes inverted, positive voltage to be applied to the input terminal of power amplifier 60 turning on that device which conducts current to the armature of drive motor 11. However, by reason of the throwing of the switches in the set 92 associated with the field winding of motor 11, the direction of the field is reversed so that the forward drive motor now operates in the reverse direction, that is, in a direction to assist the reverse drive motor 12 in the turning of the turntable in the reverse direction.

It will be apparent that the circuit described above, while having the advantage of zero backlash under normal N.C. type control, takes full advantage of the torque capability of the system in the lathe mode in either direction of rotation. For example, where ten horsepower motors are used alternatively in the N.C. mode, the additive use of the motors in the desired driving direction permits a doubling of the effective horsepower to 20. The added components required to achieve this result in accordance with the teachings of the invention consist primarily of the three added relays, F, L and R, thereby making the practice of the invention economical either for new installations or for modification of installations already in the field.

While the circuitry of the preamplifiers and power amplifiers has not been expressly set forth, it will be understood that amplifiers in both categories are commercially available from numerous sources, the power amplifiers, of course, being tailored to the current requirements of the motor being supplied. The exemplary embodiment for the sake of practicality and simplicity has been described in connection with the use of D.C. drive motors. One skilled in the art will, however, appreciate that the invention is not limited to use with motors of the D.C. type and that the invention may be practiced employing reversible A.C. motors; accordingly, the term "polarity" used herein shall be broadly construed as being the "sense" of the signal. Although electromagnetic relays have been illustrated, the invention contemplates the substitution of equivalent solid state switches or contacts, a matter well within the skill of the art.

Also while the invention has been described in connection with the driving of a horizontal turntable, it will be understood that the invention is not limited to use in any particular plane and that the term "turntable" includes any rotatable support for a machined work piece regardless of orientation. By "a source of normal control signal" is meant any source of control signal which is frequently reversed in polarity to bring about reversals in direction of table rotation.

The invention has been described, for the sake of simplicity, assuming that amplifiers are used at position 60, 70 which are respectively and exclusively responsive to positive and negative signals. In the event that it is desired to employ identical amplifiers, i.e., amplifiers exclusively responsive to the same polarity of the signal, then all that is necessary is to reverse the normally open-normally closed states of contacts F5 and F6.

What I claim is:

1. In a dual motor drive for a turntable of a machine tool capable of operating in a numerically controlled mode and a lathe mode, the combination comprising a circular rack on the turntable, a forward drive motor having a pinion, a reverse drive motor having a pinion, the pinions both being constantly coupled to the rack, a source of normal control signal variable in polarity and magnitude incident to operation in the numerically controlled mode, circuitry including amplifiers interposed between the source of normal control signal and the motors for drivingly energizing the motors alternatively depending upon the polarity of the normal control signal and at a speed which depends upon the magnitude of such signal, a source of auxiliary control signal of first polarity, means including a first set of auxiliary switches for reversing the direction of the reverse drive motor so that when the auxiliary signal of first polarity is applied both motors serve additively to drive the turntable in the forward direction in the lathe mode, a source of auxiliary control signal of second polarity, means including a second set of auxiliary switches for reversing the direction of the forward drive motor so that when the auxiliary signal of second polarity is applied both motors serve additively to drive the turntable in the reverse direction in the lathe mode, manual selector means for (a) actuating the first set of switches while applying the auxiliary control signal of first polarity and for (b) actuating the second set of switches while applying the auxiliary control signal of second polarity, and means for disabling the normal control signal while one of the auxiliary control signals is being applied.

2. In a dual motor drive for a turntable of a machine tool capable of operating in a numerically controlled mode and a lathe mode, the combination comprising a circular rack on the turntable, a forward drive motor having a pinion, a reverse drive motor having a pinion, the pinions both being constantly coupled to the rack, a source of normal control signal variable in polarity and magnitude incident to operation in the numerically controlled mode, circuitry including forward and reverse amplifiers interposed between the source of normal control signal and the respective motors, the amplifiers being exclusively responsive to signals of respectively opposite polarity so that the motors are driven alternatively depending upon the polarity of the normal control signal and at a speed which depends upon the magnitude of such signal, a source of auxiliary control signal of first polarity, first reversing means including a first set of auxiliary switches for reversing the direction of the reverse drive motor and for inverting the polarity of the signal at the input of the reverse amplifier so that when the auxiliary signal of first polarity is applied both motors serve additively to drive the turntable in the forward direction in the lathe mode, a source of auxiliary control signal of second polarity, second reversing means including a second set of auxiliary switches for reversing the direction of the forward drive motor and for inverting the polarity of the signal at the input of the forward amplifier so that when the auxiliary signal of second polarity is applied both motors serve additively to drive the turntable in the in the reverse direction in the lathe mode, manual selector means for alternatively actuating the first and second reversing means, and means for disabling the normal control signal while one of the auxiliary control signals is being applied.

3. The combination as claimed in claim 1 or in claim 2 in which both of the drive motors are of the direct voltage type having field windings supplied by a source of field current and in which the auxiliary switches are connected between the supply and the field winding for reversing the direction of flow of field current.

4. The combination as claimed in claim 1 or in claim 2 in which the auxiliary control signals have a magnitude substantially greater than the normal control signal and in which means are provided for reducing the gain of the amplifiers while one of the auxiliary control signals is being applied.

5. The combination as claimed in claim 1 or in claim 2 in which the amplifiers are biased so that when the motors are under the control of the normal control signal the relatively de-energized one of the motors applies a small amount of torque in opposition to the driving torque thereby to constantly remove the effect of backlash at the engaged teeth.

6. The combination as claimed in claim 1 in which power amplifiers are associated with the respective motors, the power amplifiers being so constructed as to respond only to input signals of unlike polarity and means for inverting the signal supplied to the power amplifier associated with the reversed one of the drive motor.

* * * * *